United States Patent [19]

Ellis

[11] 4,214,429
[45] Jul. 29, 1980

[54] BRUSH RAKE

[76] Inventor: Frederick R. Ellis, 23 Lakeview Ave., Ripley, N.Y. 14775

[21] Appl. No.: 937,261

[22] Filed: Aug. 28, 1978

[51] Int. Cl.² ......................................... A01D 77/06
[52] U.S. Cl. ....................................... 56/377; 56/10.4
[58] Field of Search ............... 56/376, 377, 15.6, 10.4, 56/395

[56] References Cited

U.S. PATENT DOCUMENTS

| | | | |
|---|---|---|---|
| 2,193,506 | 3/1940 | Beekmann | 56/395 |
| 2,459,961 | 1/1949 | Pollard | 56/377 |
| 2,603,053 | 7/1952 | Lipe et al. | 56/377 |
| 2,645,073 | 7/1953 | Dalglish et al. | 56/15.6 |
| 2,652,679 | 9/1953 | Krause | 56/377 |
| 2,710,519 | 6/1955 | Winder | 56/377 |
| 2,838,901 | 6/1958 | Davis | 56/10.4 |
| 2,926,481 | 3/1960 | Lely et al. | 56/395 |
| 2,955,406 | 10/1960 | Lely et al. | 56/377 |
| 2,975,582 | 3/1961 | Pollard | 56/377 |
| 3,093,953 | 6/1963 | Lely | 56/377 |
| 3,243,947 | 4/1966 | Goodall et al. | 56/377 |
| 3,308,611 | 3/1967 | Barber | 56/10.4 |
| 3,832,838 | 9/1974 | Hale | 56/377 |
| 4,047,370 | 9/1977 | Eve | 56/377 |

Primary Examiner—Louis G. Mancene
Assistant Examiner—Paul J. Hirsch
Attorney, Agent, or Firm—Charles L. Lovercheck

[57] ABSTRACT

A rake for removing brush from rows of vines and the like made up of a tongue member swingably attached to the front end of a tractor, a frame swingably attached to the front end of the tongue to swing about a pivot and a rake wheel supported on the frame to be rotated by ground contact and/or external power supply at an angle of approximately 45° to the direction of travel of the tractor and teeth on the outer periphery of the wheel for engaging the ground and the brush to rotate the wheel and rake the brush toward the center of the space between rows.

16 Claims, 5 Drawing Figures

BRUSH RAKE

GENERAL DESCRIPTION OF THE INVENTION

Grapes are grown on vines supported by a trellis. It is necessary to trim the excessive growth from vines and the trimmed brush must be removed from the vines and trellis manually. The rake, according to the present invention, provides a mechanical means for conveniently removing the brush from the trellis area.

REFERENCE TO PRIOR ART

The U.S. Pat. No. 2,710,519 discloses a stubble cleaner made up of a rotary rake having radially outwardly extending teeth and a hub inclined to the vertical. U.S. Pat. No. 2,829,486 discloses a side delivery rake having a rotating wheel. U.S. Pat. No. 2,861,413 discloses a side delivery rake with a wheel rotatably mounted on a frame and supported in a substantially vertical plane. None of the patents noted show a rake suitable for raking the brush from grape trellises.

OBJECTS OF THE INVENTION

It is an object of the invention to provide a rake suitable for raking the brush from grape trellises.

Another object of the invention is to provide a device for raking grape trellises that is simple in construction, economical to manufacture and simple and efficient to use.

Another object of the invention is to provide an adjustable rake suitable for raking in close proximity to obstructions.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
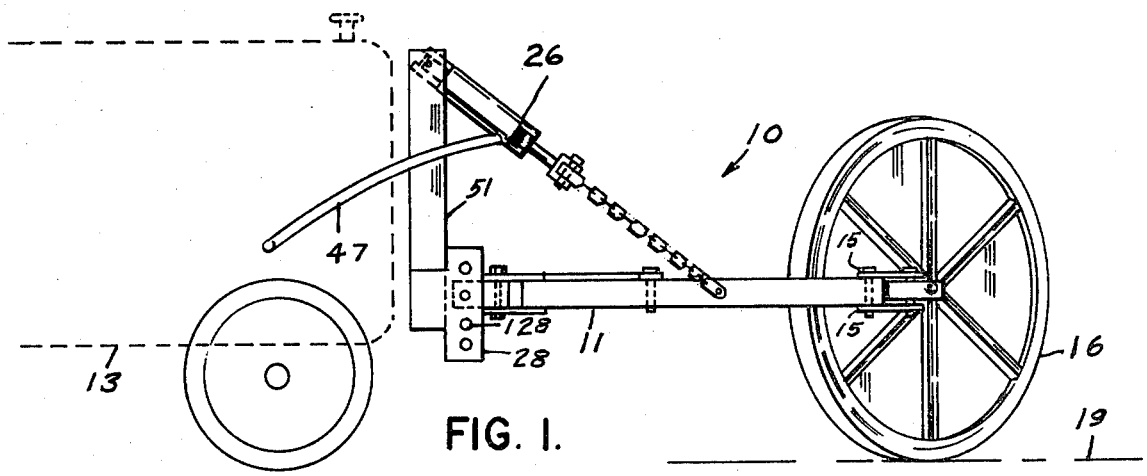
FIG. 1 is a side view of the rake according to the invention supported on a tractor.

Now with more particular reference to the drawing, the rake is shown generally at 10 supported on the front end of a tractor 13. The tractor is of the general type used on farms, but could be any suitable type of vehicle. The rake 10 is suitable for raking material from grape trellises in the rows indicated at 19. The rake has a tongue 11, which is attached to the clevis 28 by means of a pin 25. Clevis 28 has several holes 128 so that the tongue 11 can be adjusted to the desired angle. The tongue may be adjusted laterally by means of the brace 29, which is pivoted to the attaching means 51 at 30 and is swingable laterally on the pivot pin 31.

Figure 2:
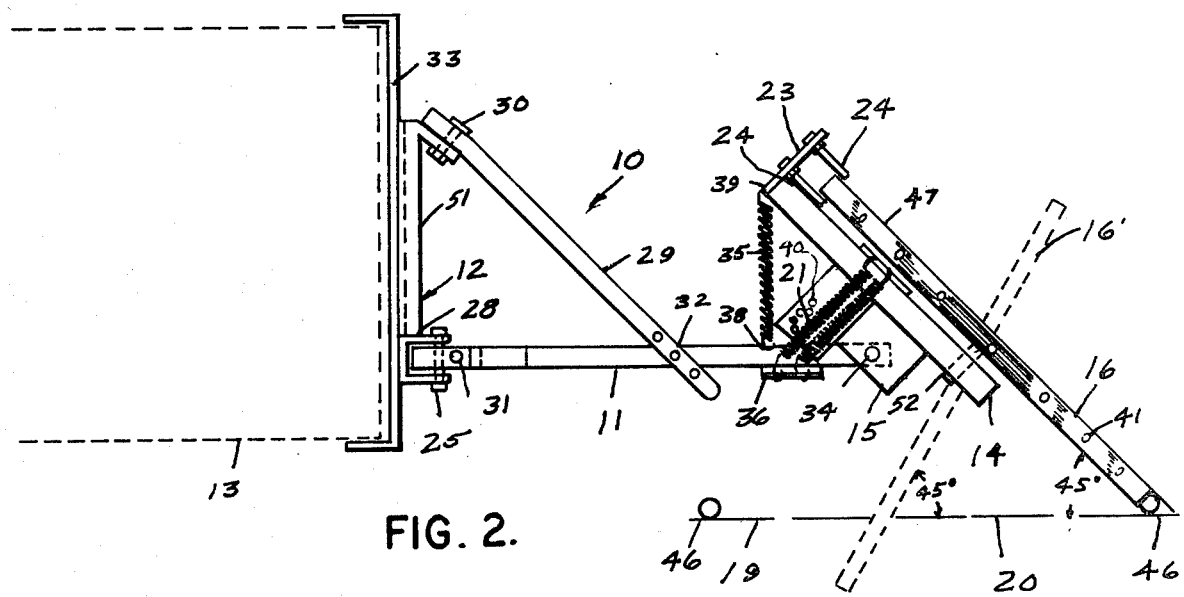
FIG. 2 is a top view of the rake shown in FIG. 1.
Figure 3:
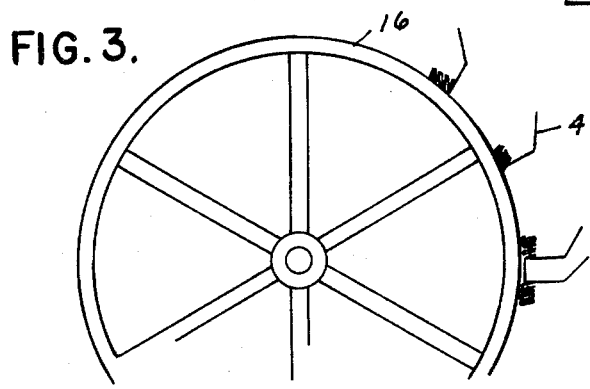
FIG. 3 is a side view of the rake wheel and tines.
Figure 4:
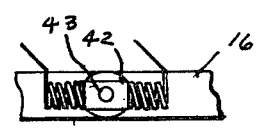
FIG. 4 is an enlarged view of two of the tines.
Figure 5:
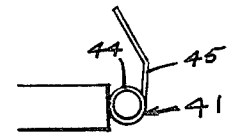
FIG. 5 is a side view of one of the tines shown in FIG. 4.

The brace 29 is selectively attached to the tongue by means of a pin 32 that extends through the brace 29 and the tongue 11. Several holes 32 are provided for adjusting the angle of the tongue to the direction of the tractor. The attaching means on channel 51 may be welded to an adaptor 33 to fit the tractor shown, but can be attached to the front of the tractor and is made specially to accommodate the particular model of tractor to be used. The frame 14 of the rake is fixed to the vertically spaced plates 15 that receive the front end of the tongue 11 between them and are pivoted to the tongue by the pin 34 so that the frame 14 can swing in horizontal plane on the front end of the tongue 11 when the leading edge of the wheel 16 strikes an obstruction, for example, a post or a grape trellis. Plate 15 have holes that receive stop pin 40 by which the angle of wheel 16 can be adjusted. The wheel 16 is pivoted to the frame 14 by the bearing and axle 52 to rotate in a generally vertical plane. It has been discovered that the wheel 16 performs better if its lower edge is slightly tilted forward, for example, at an angle of 9°. The frame 14 is urged to the position shown in FIG. 2 by the relatively long springs 21 and the frame is forced to normal position by the relatively short second springs 35. The first springs 21 are attached to a bracket 36 which is fixed to the tongue 11 and the springs 21 extend forwardly and are attached to the bracket 47 on the outer end of the frame 14. Spring 35 is attached to the tongue at 38 and to the frame 14 at 39. Thus, when the wheel 16 strikes an obstruction and swings it to the dotted line position 16', the springs 21 are pulled beyond center and the spring 35 returns the frame so that its first movement and the springs 21 move it until the stop pin 40 in one of the holes engages the tongue 11. The wheel 16 has spring tines 41 supported on its outer periphery. These spring tines are fixed to mounting plates 42 which are anchored into the wheel 16 by bolts 43. The springs each have a helical portion 44 that terminates in the outwardly and upwardly extending end 45. These ends engage the ground the the brush as the vehicle moves forward rotating the wheel and moves the brush away from under the vines.

In the event that the wheel 16 engages one of the posts 46 or any other obstruction, the wheel will swing about pivot 34 to the dotted line position 16' and will free itself from the post. Then, as the vehicle proceeds forward with the wheel in the dotted line position, the wheel will rotate in a reversed direction ridding itself of tangled vines on its outer surface.

The tongue 11 is adjustable in a vertical plane by means of the hydraulic cylinder 26, which is controlled from the hydraulic system of the tractor through line 47 and a suitable valve to swing the tongue up and down and, therefore, adjust the pressure of the wheel on the ground.

The bracket 23 has fingers 24 that receive the rim of the wheel between them. These fingers 24 stop vines from rotating with the wheel, and, therefore, keep the wheel free of entangling vines.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A rake (10) for removing foreign material from rows (19) comprising, a forwardly extending tongue (11),
attaching means (12) for attaching said tongue to the front end of a tractor (13),
a frame (14),
pivot means (15) swingably attaching said frame to said tongue (11) to swing about a vertical pivot,
a wheel (16) rotatably supported on said frame,
resilient means (21) urging said frame to swing to a position at an acute angle to the direction of travel of said tractor,
tooth means (18) on the periphery of said wheel (16) for engaging the ground to rotate the wheel (16) and rake the foreign material from the rows (20).

2. The rake recited in claim 1 wherein said tooth means (41) comprises,
spring teeth fixed to the outer periphery of said wheel.

3. The rake recited in claim 1 wherein said pivot means (15) comprises,
spaced plates fixed to said frame and receiving the front end of said tongue therebetween,
pin means (34) extending through said plates and through said tongue providing a pivot for said frame on said tongue.

4. The rake recited in claim 3 wherein resilient means (21) is connected to said tongue and to said frame urging said frame to swing through a plane perpendicular to said tongue to and acute angle.

5. The rake recited in claim 4 wherein said acute angle is approximately 45°.

6. The rake recited in claim 5 wherein stop means (40) is supported on said frame for limiting the swinging movement of said frame.

7. The rake recited in claim 6 wherein said frame is pivoted to said tongue to swing from said first acute angle to a position perpendicular to said tongue and an obtuse angle to said frame whereby said wheel is rotated in a reverse direction by said ground contact for removing brush from said wheel.

8. The rake recited in claim 7 wherein said obtuse angle is approximately 270° to said frame.

9. The rake recited in claim 7 wherein said resilient means comprises,
a first said spring (21) to urge said frame to swing from said obtuse angle to an acute angle to said frame,
a second spring (35) to urge said frame to swing to said stop at said acute angle to said tongue.

10. The rake recited in claim 9 wherein wheel cleaning means is attached to said frame,
said wheel cleaning means comprising,
spaced rods fixed to said frame and receiving the outer periphery of said wheel therebetween and extending radially of said wheel for removing brush from said wheel.

11. The rake recited in claim 10 wherein said attaching means (12) comprises,
a bar (24) adapted to be attached to the front end of said tractor (13) and means (25) pivotally connecting said tongue (11) to said bar to swing about a horizontal axis.

12. The rake recited in claim 11 wherein adjustable means (26) is provided for swinging said tongue up and down about said horizontal axis to adjust the wheel relative to the ground.

13. The rake recited in claim 12 wherein said adjustable means comprises,
a hydraulic cylinder.

14. The rake recited in claim 13 wherein brace means is provided attached to said bar (24),
means to adjust the angle of said tongue to the direction of travel of said tractor by adjusting the position of said brace to said tongue.

15. The rake recited in claim 3 wherein said wheel is supported on said frame by an axle (26) and said axle is disposed on an axis that extends forwardly and upwardly at a slight angle to the horizontal.

16. The rake recited in claim 15 wherein said slight angle is approximately 9 degrees.

* * * * *